No. 855,112. PATENTED MAY 28, 1907.
C. S. MacMULLAN.
HANDHOLD STRAP FOR AUTOMOBILES.
APPLICATION FILED MAR. 8, 1907.

WITNESSES:

INVENTOR
Charles S. MacMullan.
BY Geo. H. Strong
ATTORNEY

UNITED STATES PATENT OFFICE.

CHARLES S. MacMULLAN, OF OAKLAND, CALIFORNIA.

HANDHOLD-STRAP FOR AUTOMOBILES.

No. 855,112.   Specification of Letters Patent.   Patented May 28, 1907.

Application filed March 8, 1907. Serial No. 361,247.

*To all whom it may concern:*

Be it known that I, CHARLES S. MACMULLAN, a citizen of the United States, residing at Oakland, in the county of Alameda and State of California, have invented new and useful Improvements in Handhold-Straps for Automobiles, of which the following is a specification.

My invention relates to a hand-hold-strap for automobiles and the like. Its object is to provide an attachment for the seat of a motor car, which the occupants of the car may take hold of in case of need to prevent their being jolted around or thrown out; and which attachment shall be simple, cheap, neat and attractive, and which may be concealed from view when not in use.

The invention consists of the parts and the construction and combination of parts as hereinafter more fully described and claimed, having reference to the accompanying drawings, in which—

Figure 1:
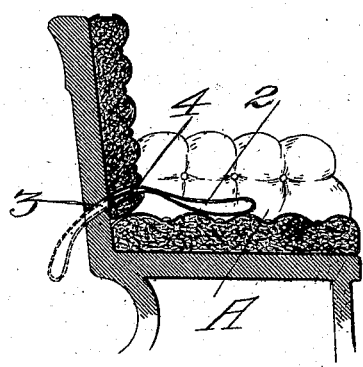
Figure 2:
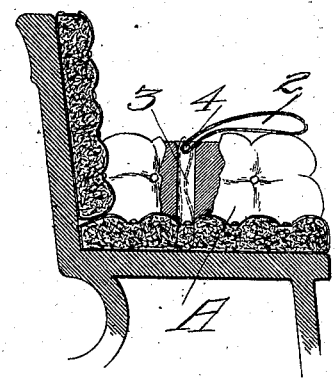

Figure 1 is a sectional view of a vehicle seat showing the hand-strap operable in a pocket in the back portion of the seat. Fig. 2 is a similar view showing the strap operable in a pocket in the side portion of the seat.

A represents the seat of a vehicle to which the invention is to be applied.

The invention simply consists of a strap 2 preferably looped and running through a hole 3 in the back or bottom of the seat or into a pocket formed therein, and provided with suitable anchorage means at the ends whereby the strap will be permitted a limited movement forward and back or up and down in the opening or pocket, yet not to be drawn clear out of the hole or pocket.

The simplest construction, and the one preferred, is the passage of a pin 4 crosswise of the opening 3 and through the loop of the strap 2; the pin being fixed in the solid part of the seat and the strap slidable back and forth or in and out about the strap. When the device is not in use the strap is pushed out and back through the hole, leaving the strap concealed, or nearly concealed, from view in front, as shown in dotted lines Fig. 1; the pin preventing the strap being lost out. When the strap is needed as a hand-hold, it is pulled forward into the position shown in full lines Fig. 1: The pin again serving as an anchorage to the end of the loop and preventing the strap being pulled through the hole and loose from the seat. Manifestly there may be any desired number of these hand-hold-straps; generally two for each occupant, one strap on each side of the occupant. Also it is manifest that these straps may be disposed at any desired points in the seat, and the form of pocket to receive the strap may be varied, all without altering the principle of the invention.

Having thus described my invention, what I claim and desire to secure by Letters Patent, is—

1. The combination with a vehicle seat having an opening, of a hand-hold-strap slidably held in said opening, and an anchorage member to limit the sliding movement of the strap in and out of the opening.

2. The combination with a vehicle seat having an opening, of a fixed pin in the opening, and a looped-strap embracing the pin and slidable thereon in and out of the opening, said pin serving as an anchorage for the strap.

In testimony whereof I have hereunto set my hand in presence of two subscribing witnesses.

CHARLES S. MacMULLAN.

Witnesses:
S. H. NOURSE,
JESSIE C. BRODIE.